United States Patent [19]
Hodson et al.

[11] Patent Number: 5,392,660
[45] Date of Patent: Feb. 28, 1995

[54] LOAD MONITOR

[75] Inventors: Lynton C. Hodson; Graeme J. Winstanley; Grant D. Hodson; Neville G. Barden; Mervyn J. Joyce; Keith G. Batten, all of Queensland, Australia

[73] Assignee: The South East Queensland Electricity Board, Queensland, Australia

[21] Appl. No.: 1,579

[22] Filed: Jan. 6, 1993

[30] Foreign Application Priority Data

Jan. 17, 1992 [AU] Australia .................... PL0454

[51] Int. Cl.⁶ .................................... G01L 5/00
[52] U.S. Cl. ........................ 73/862.393; 73/862.391
[58] Field of Search ............ 73/862.391, 862.393, 73/862.474, 862.57, 329, 862.44, 862.56

[56] References Cited

U.S. PATENT DOCUMENTS 4,461,459  7/1984  Conti .
4,692,063  9/1987  Conti .

FOREIGN PATENT DOCUMENTS 2614698  11/1988  France ................ G01L 6/10

OTHER PUBLICATIONS

Lancier, "Fibertrac-The Proven Measurement System For Fibre Optic Cable Laying". (Brochure)
Arnco Equipment, Leaflet.
PIAB Brochure.
M&W Engineering Brochure.

Primary Examiner—Richard E. Chilcot, Jr.
Assistant Examiner—R. Biegel
Attorney, Agent, or Firm—Renner, Otto, Boisselle & Sklar

[57] ABSTRACT

A load monitor responsive to tension or pressure is disclosed. The monitor has attachment portions at its ends and a transmitter. The attachment portions are electrically isolated from one another and the transmitter has its output connected to the attachment portions. Cables connected to the attachment portions act as an antenna for propagating the signal to a remotely located receiver.

13 Claims, 2 Drawing Sheets

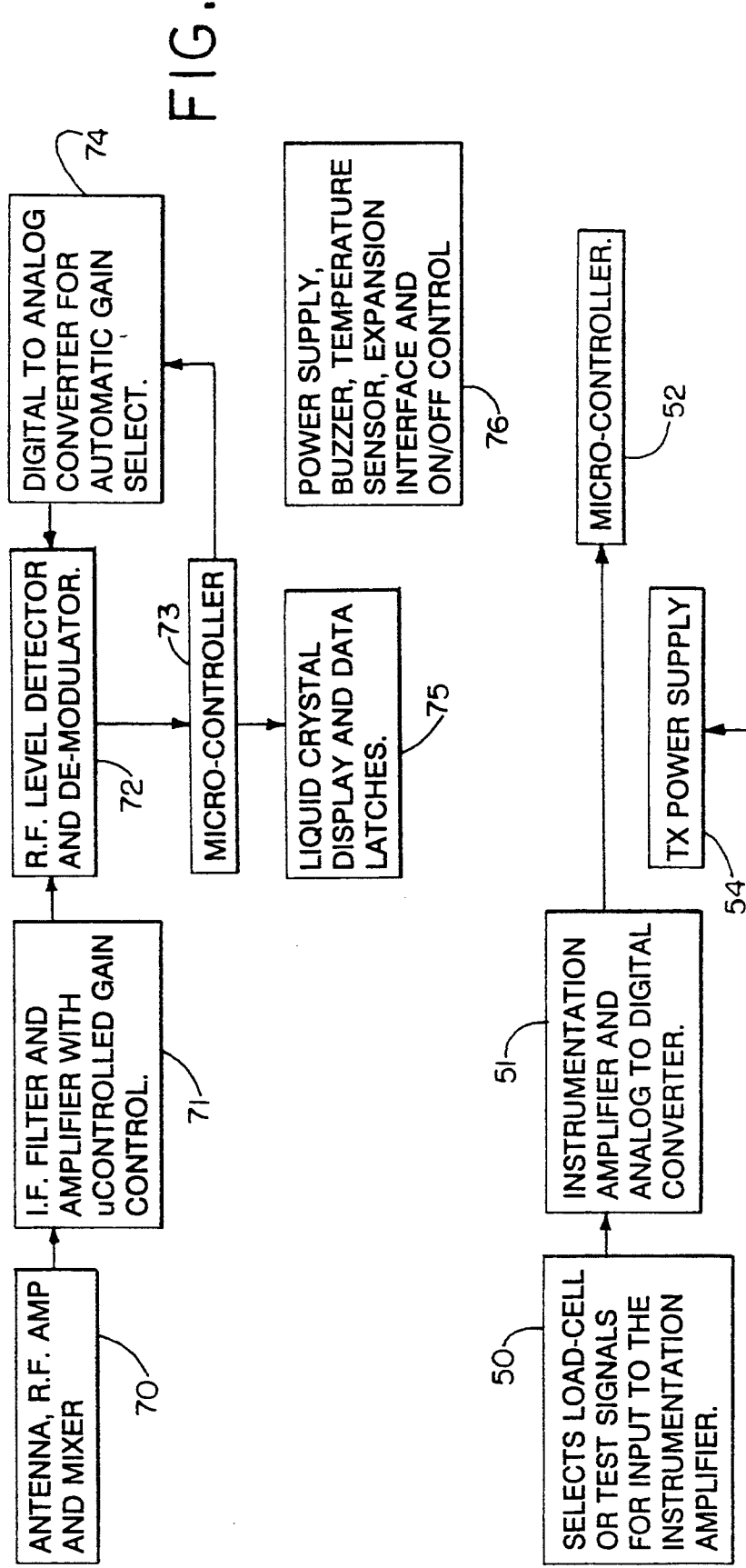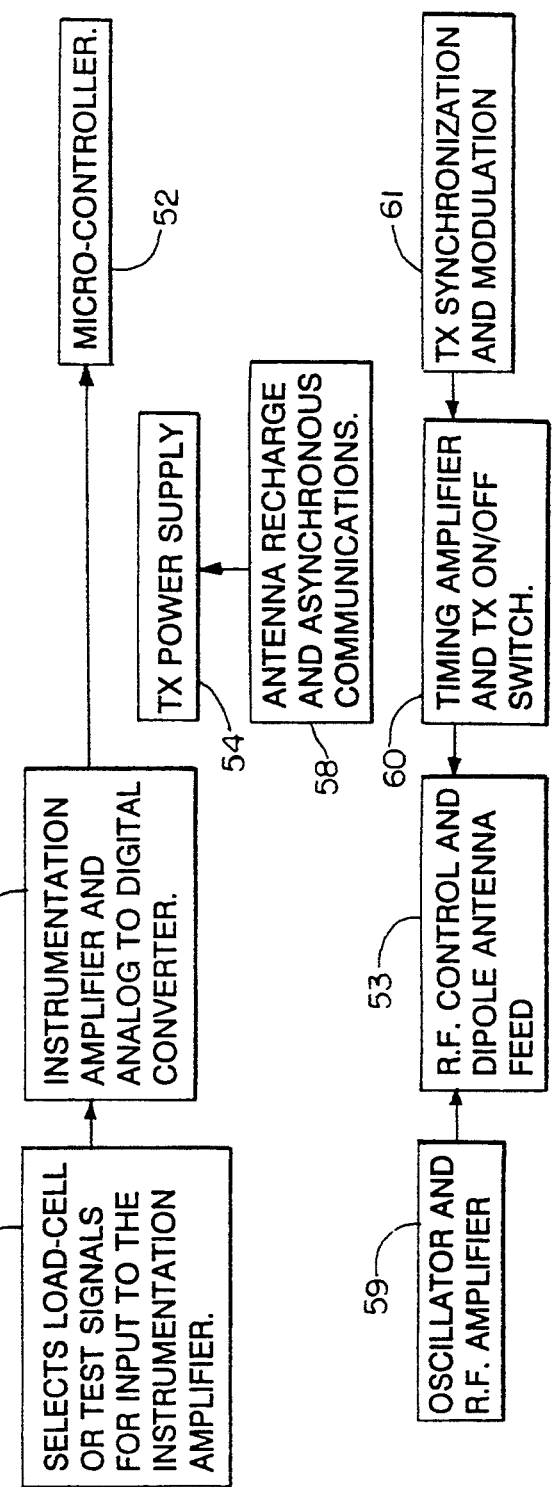

LOAD MONITOR

BACKGROUND

This invention relates to a load monitor.

In particular, the invention concerns a tension monitor and it will be in relation to the monitoring of tension during the installation of electrical power cables that this invention will be described. It should be appreciated that this is by way of example only and that the monitor of the invention may be used for other purposes. For example, the monitor of the invention may be used for remote crane load indication and to monitor the compressive force applied to an article.

Load monitors are known and have variously been called force gauges or dynamometers. Such monitors are manufactured by M & W Engineering (Denmark), PIAB (Sweden) and ARNCO CORP (U.S.A.).

The M & W monitor had oppositely directed attachment portions and incorporated a load cell. An output display was visible on the housing of the monitor and remote reading was possible by securing a cable between the monitor and an optional remotely located control box. The cable disclosed was 10 meters in length.

The PIAB monitor also had a display for in situ reading. For remote reading the monitor was provided with a built-in potentiometer for transmitting a signal via a cable to a receiving instrument.

Such load monitors have a wide variety of uses in lifting, pushing and hauling applications. It has been found that in the laying of electrical cables in conduits are has to be taken to ensure that the cable is not subjected to undue tension as this can lead to damage to the cable. To lay electrical cables a capstan drive or winch was employed to wind in a winch cable to draw the electrical cable through the conduit. In the past attempts were made to monitor the tension applied to the winch cable. However, the tension to which the winch cable may be subjected need not necessarily correspond to the tension to which the electrical cable is subjected. U.S. Pat. No. 4,692,063 discloses a system for monitoring cable tension.

U.S. Pat. No. 4,461,459 discloses an apparatus for and a method of measuring tension in a pull line for an electrical cable. Clearly, where the electrical cable is underground or within a duct, remote readings of the tension are required. U.S. Pat. No. 4,461,459 discloses three ways in which the tension signal from the apparatus may be made available remotely of the apparatus. One way involved the use of a long pull tape between the apparatus and a remote receiver. The pull tape included conductors along which a tension indicative signal was conducted. The specification also proposed the use of an audio transducer and a microphone. This was not always practical because of the environment through which the electrical cable was drawn or the distances involved.

The final proposal required the presence of a separate conductor adjacent the duct or conduit through which the electrical cable was to be drawn. The apparatus included a transmitter for inducing tension indicative signals into the separate conductor. The separate conductor had a receiver associated with it. This proposal required the presence of a separate conductor and this was not always the case or possible to achieve.

SUMMARY OF THE INVENTION

It is an object of the present invention to provide a load monitor which at least minimises the disadvantages referred to above.

According to one aspect of the invention there is provided a load monitor including attachment portions at opposed ends, said attachment portions being electrically isolated from one another, a transmitter having its output coupled to the attachment portions for transmitting a load indicative signal to a remote location whereby conductive members coupled to said attachment portions act as a dipole antenna for transmitting said signal to the remote location.

The load to which the monitor may be subjected may either be a tensile or a compressive load.

The monitor includes a load cell responsive to the load to provide a load signal for the transmitter. Preferably the load cell includes a spindle extending between the attachment portions and strain gauges are secured to the spindle. Preferably, four strain gauges are arranged in a bridge configuration and spaced around the spindle.

The attachment portions are electrically isolated from one another. Where the monitor has a spindle, one or both of the attachment portions may be isolated from the spindle although it is preferred that only one of these portions be isolated from the spindle.

Isolation may be achieved by positioning electrical insulators between the attachment portions and/or the portions and the spindle. Where the monitor has an outer casing or housing it is sufficient for one of the attachment portions to be isolated from the housing but not from the spindle while the other attachment portion may be isolated from the spindle but in direct contact with the housing. Insulating sleeves, spacers or washers may be employed.

The attachment portions enable conductive members such as an electric cable to be secured to one end and a draw cable to be attached to the other end of the monitor. Preferably one attachment portion is a tongue while the other attachment portion is a clevis.

The monitor may include a power supply. It is preferred that a battery power supply be present. The monitor may include an amplifier for receiving an output from the strain gauges and for boosting that output to a desired level. A microprocessor may be present for conditioning the amplified signal and supplying the conditioned signal to the transmitter. The transmitter is coupled to the attachment portions so that the load indicative signals may be transmitted to a remote location.

BRIEF DESCRIPTION OF DRAWINGS

A particular preferred embodiment of the invention will now be described by way of example with reference to the drawings in which:

FIG. 3 is a block diagram of a receiver for the load monitor; and

FIG. 4 is a block diagram of a transmitter for the load monitor.

DETAILED DESCRIPTION

Figure 1:
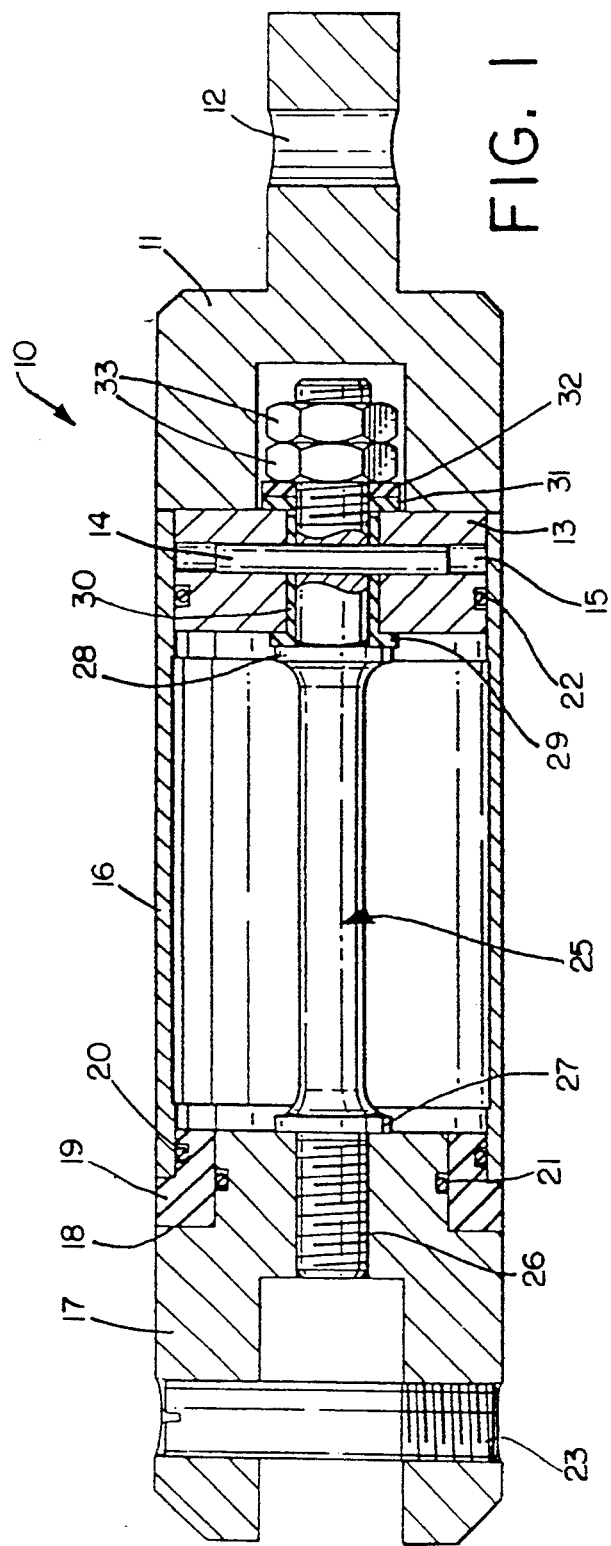
FIG. 1 is a longitudinal sectional view of a load monitor according to an embodiment of the invention.

In FIG. 1 a longitudinally sectioned view of a load monitor 10 is shown. The monitor has a tongue 11 at one end. The tongue 11 has an aperture 12 to enable the monitor to be attached to a winch cable (not shown). The tongue 11 is secured to collar 13 by fasteners (described in greater detail with reference to FIG. 2). The collar 13 has a diametrically extending bore 15 which receives pin 14 made of fibreglass. A tubular housing 16 extends between tongue 11 and clevis 17.

The clevis 17 has a stepped portion 18 which receives annular insulating member 19. Member 19 caries an O ring seal 20 while the stepped portion has an O ring seal 21. The collar 13 has an O ring seal 22. These seals prevent moisture from entering the interior of the load monitor.

The clevis 17 has a diametric screw threaded pin 23 extending across it and to which the electric cable being laid may be secured.

Spindle 25 has a screw threaded end 26 to which the clevis 17 is attached. Flange 27 provides an abutment for the clevis 17. The other end of the spindle has a flange 28 against which a stepped portion 29 of insulating sleeve 30 abuts. This end of the spindle 25 is also screw threaded and receives insulating washers 31, 32 held in place by nuts 33.

Figure 2:
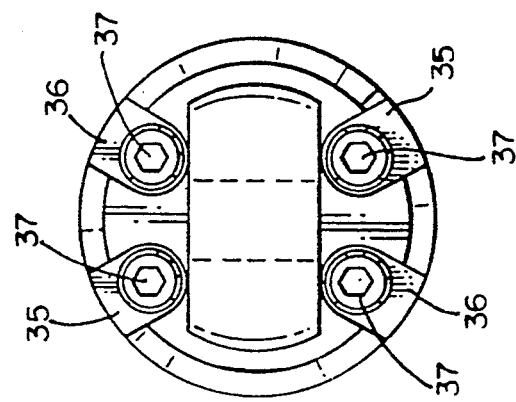
FIG. 2 is an end view of the monitor of FIG. 1.

From FIG. 2 it is evident that the tongue 11 has diametrically opposed pairs of recessed portions 35, 36 and it is in these recesses that longitudinally extending bores are formed for receiving threaded fasteners 37. Although not evident from the longitudinal sectional view of FIG. 1, the collar 13 has threaded apertures for receiving ends of the fasteners 37. It is in this way that the tongue is secured to the remainder of the load monitor 10.

FIG. 4 shows a block diagram of a transmitter for the load monitor. Strain gauges are arranged around spindle 25 to form a load cell and are present in block 50. These gauges are typically in a bridge circuit and are regularly spaced around the spindle.

Amplifier 51 is coupled to the strain gauges and receives an output from the gauges and makes an amplified output available to the microcontroller 52 which conditions the amplified output. Dipole antenna feed 53 is configured to couple a modulated RF output to both the clevis 17 and the tongue 11. One of each of the tongue 11 and clevis 17 is electrically coupled to the electric cable being winched while the other of the tongue and clevis is electrically coupled to the winch cable. This configuration ensures that the electric cable and winch cable function as a dipole antenna for transmitting a load indicative signal from the load monitor 10 to a remote location. The circuitry of FIG. 4 is contained within housing 16. An RF oscillator and amplifier 59 is coupled to block 53 while block 60 includes a timing amplifier and a on/off switch for the transmitter. Block 61 contains transmitter synchronization and modulation circuitry.

Power supply 54 typically includes a nickel-cadmium battery. The battery included in block 54 may be nonintrusively recharged periodically under the control of block 58 when a DC source is connected to the antenna. RF signals may be coupled to the attachment portions and block 58 for diagnostics and system configuration via block 50.

FIG. 3 shows a block diagram of a receiver circuit. The receiver circuit is present remotely spaced from the load monitor and receives signals from the dipole antenna discussed above. The receiver includes an antenna, RF amplifier and mixer 70. This is coupled to a block 71 which includes an I.F. filter and amplifier with micro-controlled gain control. RF level detector and demodulator 72 is coupled to block 71.

Micro-controller 73 is coupled to demodulator 72 and to digital to analog converter 74. Converter 74 provides for gain selection. The output provided by block 73 is made available to display 75. Power supply block 76 includes on/off controls for the receiver, an audible alarm, a temperature sensor and interface circuitry.

We claim:

1. A load monitor including spaced attachment portions, said attachment portions being electrically isolated from one another, a transmitter having its output coupled to the attachment portions for transmitting a load indicative signal to a remote location whereby conductive members coupled to said attachment portions act as a dipole antenna for transmitting said signal to the remote location.

2. The load monitor of claim 1 including a housing, a spindle connected to and extending between the attachment portions, wherein at least one of the attachment portions, as well as being electrically isolated from the other said attachment portion, is electrically isolated from the housing.

3. The load monitor of claim 2 wherein both said attachment portions are electrically isolated from the spindle.

4. The load monitor of claim 2 including insulators between the attachment portions.

5. The load monitor of claim 2 including insulators between one said attachment portion and the spindle.

6. The load monitor of claim 4 wherein one said attachment portion has a stepped portion for receiving an annular insulating member for electrically isolating the one attachment portion from the housing.

7. The load monitor of claim 6 including respective seals between the annular insulating member and the one attachment portion and between the annular member and the housing.

8. The load monitor of claim 7 wherein the one attachment portion is screw threaded to one end of the spindle.

9. The load monitor of claim 5 wherein the other end of the spindle includes a sleeve of electrical insulating material extending thereover, a collar extending around the sleeve and having screw threaded apertures for receiving fasteners extending through the other attachment portion.

10. The load monitor of claim 9 including fasteners receivable by the other end of the spindle for maintaining the sleeve on the spindle.

11. The load monitor of claim 9 including a sealing member located between the housing and the collar.

12. The load monitor of claim 2 including four strain gauges connected in a bridge configuration and arranged spaced equi-distant around the spindle.

13. The load monitor of claim 1 wherein the attachment portions comprise a clevis and a tongue extending from opposite ends of the load monitor.

* * * * *